Sept. 9, 1958  D. D. PEEBLES  2,851,364
GELATIN PRODUCT AND PROCESS OF MANUFACTURE
Filed June 21, 1956
FIG_1_
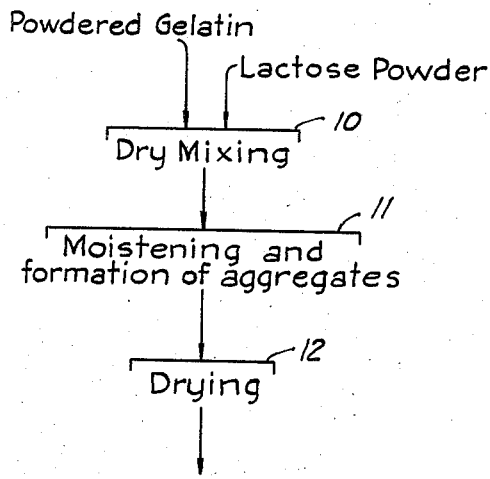
FIG_2_
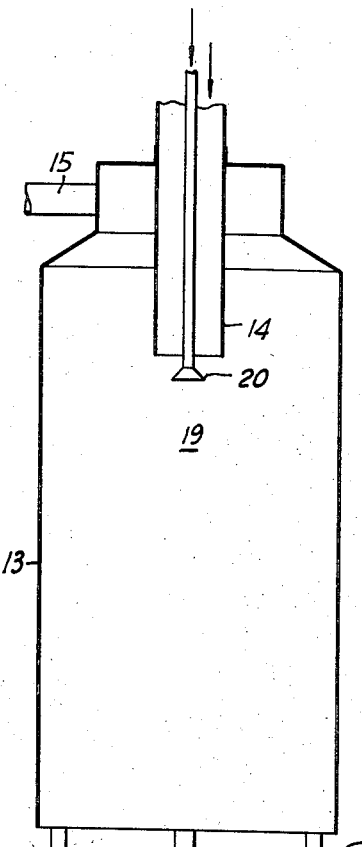
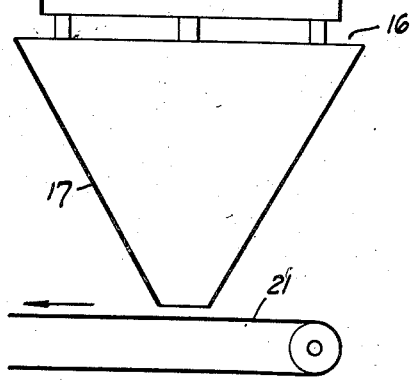
INVENTOR
David D. Peebles
BY
ATTORNEYS United States Patent Office 2,851,364
Patented Sept. 9, 1958

2,851,364

GELATIN PRODUCT AND PROCESS OF MANUFACTURE

David D. Peebles, Davis, Calif., assignor to Foremost Dairies, Inc., San Francisco, Calif., a corporation of New York Application June 21, 1956, Serial No. 592,820

7 Claims. (Cl. 99—130)

This invention relates generally to dry gelatin containing products and to processes for manufacturing the same.

Commercial gelatin is generally sold in the form of a dry divided material, the individual particles of which are solidified solid fragments produced by grinding or crushing. It is produced in several grades, including edible gelatin sold for human consumption and used in desserts, ice cream mixes, confections, jellied meats and other applications where purity and flavor standards are important. Also a number of technical grades are made which are suitable for uses such as in photography, in the paper industry for sizing, for fining, and in the manufacture of glues and cements. A characteristic of all grades is that the dry material will soften and swell when contacted with warm water, and it may be mixed with hot water to form a dispersion which gels when cooled. The usual coarse particle form of the dry material is unsatisfactory in that it takes considerable mechanical mixing to completely disperse the solid fragments. It will be apparent that a coarse fragment cannot be dispersed until sufficient hot water has penetrated it to form a soft swollen mass. This requires considerable time, depending upon such factors as the temperature of the water and the size of the fragment. When such dry gelatin is ground to the form of a powder, it becomes increasingly difficult to disperse the material in hot water. This is because when a mass of powdered gelatin is contacted with hot water, immediate swelling of the particles occurs with the result that the swollen particles block penetration of water into the interior of the mass. Thus when a mass of finely powdered gelatin is introduced into a quantity of hot water and the mixture stirred, sticky lumps are formed which hinder solution of the gelatin and which requires vigorous agitation or beating to break up the lumps.

In general it is an object of the present invention to provide a process capable of producing a new gelatin product characterized by the fact that it can be more readily dispersed in hot water.

Another object of the invention is to provide a new gelatin product which will not form sticky lumps when a mass is contacted with warm water, and which will have a particle form such as to facilitate ready penetration of water.

Another object of the invention is to provide a new gelatin product and process for its manufacture which provides a material in the form of aggregates, each aggregate being formed by smaller particles of dry gelatin cemented together.

Additional objects and features of the invention will appear from the following description in which the preferred embodiments have been set forth in detail in conjunction with the accompanying drawing.

Referring to the drawing:

Figure 1 is a flow sheet illustrating one procedure for carrying out the process.

Figure 2 is a side elevational view in section schematically illustrating equipment which can be used for the aggregating operation.

In accordance with the present method I first produce a gelatin in the form of a finely divided dry powder. This material is intermixed with dry lactose powder, and the mixture supplied to treating apparatus such as shown in Figure 2. In passing through this apparatus the particles of the powder are moistened to make them sticky and they are caused to co-mingle whereby they adhere together in the form of porous random aggregates. The porous aggregates are subjected to drying whereby the moisture content is reduced to the value desired.

In the flow sheet of Figure 1 dry powdered gelatin is shown being delivered to the dry mixing operation 10, and the resulting dry mix is supplied to the moistening and aggregating operation 11, which as mentioned above is carried out in the apparatus of Figure 2. The final drying operation 12 serves to reduce excess moisture, and is carried out in such a manner as to avoid grinding or crushing of the aggregates.

The apparatus of Figure 2 consists of a vertical chamber 13 having a downwardly extending inlet conduit 14 for continuously introducing the dry mix of gelatin and lactose powder, as conveyed pneumatically from a suitable supply hopper. Some air is continuously removed from the chamber through conduit 15, whereby air is drawn into the chamber through the lower opening 16 between the main part of the chamber and the discharge hopper 17. The powdered material fed to the equipment passes in dispersed condition through a treatment zone 19 where it is co-mingled with finely atomized water discharged from the atomizing nozzle 20. The particles of falling powder acquire moisture in zone 19 whereby the particles are made sticky, and the simultaneous comingling of this material causes random contacts and adherence between the sticky particles with the result that aggregates are formed having a size substantially greater than the particle size of the original powder. The aggregates discharging from the lower end of the apparatus may have a moisture content (total) ranging from about 15 to 25 percent, about 16 to 18 percent being deemed optimum. The powder and air entering the chamber through conduit 14 can be ambient, such as from 60° to 90° F. The temperature in zone 19 is somewhat less than ambient, due to water evaporation, and may for example range from 50° to 80° F. Water at tap temperature can be supplied to nozzle 20, as for example from 50° to 70° F.

As previously stated, in passing through the zone 19 the individual powder particles acquire moisture. The time and temperature factors are such that no substantial amount of softening of the gelatin particles occur. The particles of lactose powder become sticky, including both particles that may be in free flight and particles that are mechanically attached to particles of gelatin. Also although the particles of gelatin do not soften to any substantial extent, their moistened surfaces acquire some stickiness. The stickiness of the particles causes firm attachment between contacting particles of the gelatin powder, thereby forming relatively firm porous aggregates capable of retaining their identity and withstanding handling during final drying. These moist porous aggregates comprise particles of gelatin, corresponding substantially to the original particles of the gelatin powder, adhered together in the aggregates by virtue of the sticky lactose present.

The time period of treatment in the equipment of Figure 2 may range from about 10 to 60 seconds. The discharging material is carried by suitable conveying means, such as an endless belt conveyer 21 to the finishing dryer. The conveyer provides a holding period of from 30 to 90 seconds, during which time the quiescent mass undergoes a change which better conditions it for final drying. Particularly the material becomes noticeably firmer and less sticky whereby as discharged from the conveyer it is a free flowing mass.

The drying equipment employed for removing excess moisture should leave the aggregates relatively intact, or in other words it should involve a minimum amount of grinding or crushing. The initial drying temperatures employed should be kept sufficiently low to prevent serious softening and swelling of the gelatin particles. Suitable equipment for this purpose employs a screen provided with small perforations, and which is vibrated to cause the material to progress from the feed to the discharge end of the same, and to apply vertical motion to maintain the powder as a loose working layer. In conjunction with the vibrating action, warm dry air is delivered upwardly through the screen to pass upwardly through the layer of powder. The number and size of the openings in the screen are so chosen in relation to the rate of air delivery therethrough that the product on the screen is fluffed or levitated to form a layer several times the thickness it would normally have if at rest. By this technique the product is caused to progress along the screen and is at least partially supported by the cushion of air interminged therewith. This provides drying action without rough mechanical handling which might break up the aggregates. The temperature of the drying air (inlet) or the first stage of such drying can be of the order of 150° to 175° F. (160° F. optimum). After the moisture conent has been reduced to about 12 percent, drying can be continued in a subsequent stage or stages with drying air (inlet) at a temperature of from 250° to 300° F., to produce a final moisture content of from 1.5 to 5.0 percent. Following final drying the material may or may not be subjected to screening or other sizing operations to produce a final product of relatively uniform size. Over-sized particles may be subjected to light crushing.

It is preferable that the particle size of the gelatin and lactose powders supplied to the process be such that the bulk of the particles will pass through a 100 mesh screen. Although coarser gelatin powder can be used, this has the effect of reducing the ease with which the material can be dispersed in hot water, and it makes for less uniformity with respect to the character and size of the aggregates.

With respect to the lactose powder employed, it is desirable that a portion of the powder be in the anhydrous or amorphous form, and another portion crystalline (i. e. alpha lactose monohydrate). Thus for 100 parts of lactose powder, from 40 to 60 parts may be anhydrous, and the remainder crystalline. The quality of the lactose employed should be compatible with the quality of the product being produced. The particle fineness can be comparable to that produced by commercial spray drying operations, as for example such that the bulk of the particles pass through a 100 mesh screen. If desired a portion of the lactose can be added to the aqueous gelatin concentrate prior to drying to produce a divided material. In such event the amount of anhydrous lactose powder employed can be reduced accordingly.

The amount of lactose employed, in proportion to the gelatin content, may vary in accordance with the applications desired for the product and the desired strength for the final aggregate. In general the aggregates tend to become stronger and less susceptible to crushing, as the percentage of lactose is increased. Good results have been obtained with lactose contents ranging from 25 to 60 percent of the total product, from 45 to 55 percent being deemed optimum.

A gelatin product made in accordance with the foregoing process has a number of novel and desirable characteristics. When a mass of the material is introduced into hot water and stirred as by means of a spoon, no sticky lumps are formed, but on the contrary the aggregates wet quickly and rapidly dissolve. In other words there is an absence of blocking and lumping as previously described, and which in conventional powdered gelatin is caused by the swelling of the gelatin particles. A further desirable characteristic of the product is that it is relatively free flowing and can be packaged in containers of the type provided with a pouring spout. The major part of the lactose content is crystallized, whereby the product is non-hydroscopic.

My product can be applied to a wide variety of uses where the presence of lactose can be tolerated, or may be desirable. For example my product can be used for a variety of food desserts, including puddings and ice cream mixes, and in addition it can be used in confections and for jellied meats. Also it can be used for various technical purposes where the lactose content can be tolerated.

By way of example, in one particular instance the process was operated as follows: powdered gelatin of edible grade was employed, and had a screen analysis as follows:

Screen analysis of gelatin used:
```
On 100 mesh_____ 7.5
On 140 mesh_____ 32.0
On 200 mesh_____ 33.0
Thru 200 mesh_____ 27.5
```

The gelatin powder had a total moisture content of about 9.0 percent. Fifteen pounds of the powdered gelatin was dry mixed with fifteen pounds of powder lactose, the lactose consisting of 7.75 pounds of crystalline lactose (alpha monohydrate) and 7.25 pounds of anhydrous lactose. The lactose powder had a fineness such that the bulk of the material would pass through a 100 mesh screen. The dry mix was supplied continuously to the apparatus of Figure 2, and the introduction of atomized water was controlled to produce a total moisture content of about 18 percent for the moist aggregated material discharging upon the conveyer belt 21. The average temperature within the zone 19 was about 70° F. The moist porous aggregated material was subjected to final drying in drying equipment of the type previously described, to produce a final product having a moisture content of about 1.4 percent. The screen analysis of this material was as follows:

```
                                              Percent
On 20 mesh screen_____ None
Through 20 on 28 mesh screen_____ 5.1
Through 28 on 35 mesh screen_____ 25.4
Through 35 on 50 mesh screen_____ 27.5
Through 50 on 60 mesh screen_____ 20.5
Through 60 on 80 mesh screen_____ 13.3
Through 80 on 100 mesh screen_____ 8.2
Through 100 mesh screen_____ Trace
```

Upon microscopic analysis, the fragments appeared as random aggregates comprising the original particles of the gelatin powder cemented together in random fashion by the lactose. When introduced into hot water, the product readily dispersed upon simple stirring by a spoon. The bulk density was about 200 gms. per liter, or about one fourth as heavy as the original gelatin powder. Of the lactose content 90 percent was crystallized as alpha lactose monohydrate.

My gelatin product is compatible with additives of the type frequently incorporated with commercial gelatin. Particularly, reference can be made to the addition of sweetening materials such as sucrose, dextrose and corn sugar, and flavoring such as vanilla, fruit flavors, and the like.

I claim:

1. In a process for the manufacture of a dry gelatin product, dry mixing powdered gelatin with powdered lactose, adding moisture to the particles of the mix to make them sticky causing the particles to contact and adhere together in the form of moist porous aggregates, and removing excess moisture from the aggregates.

2. In a process for the manufacture of a dry gelatin product, mixing gelatin powder with lactose powder, a substantial portion of the lactose powder being in crystalline form and the other portion being anhydrous, supplying moisture to the particles to make them sticky and causing the sticky particles to adhere together in the form of moist porous aggregates, and then removing excess moisture from the aggregates.

3. In a process for the manufacture of a dry gelatin product, causing dry powdered material consisting of gelatin and anhydrous lactose to pass in dispersed condition through a treatment zone, continuously introducing sufficient atomized water droplets into the treatment zone whereby the particles of powder are moistened and thereby made sticky, co-mingling the particles whereby they are brought into random contacts to form porous random aggregates, and removing excess moisture from the aggregates.

4. In a process for the manufacture of a dry gelatin product, mixing gelatin powder with anhydrous powdered lactose, causing the mix to pass in dispersed condition through a treatment zone, introducing sufficient atomized water droplets into the treatment zone whereby the particles are caused to be moistened and made sticky, co-mingling the moistened particles whereby they are brought into contact to form porous random aggregates and then removing excess moisture from the aggregates.

5. In a process for the manufacture of a dry gelatin product, dry mixing gelatin powder with lactose powder, a substantial portion of the lactose powder being crystalline and the remainder being anhydrous, causing the powder to pass continuously through a treatment zone having an average treatment temperature of the order of 50° to 80° F., continuously introducing atomized water droplets into said zone, powder particles in said zone being moistened and the moist particles being co-mingled to cause random attachment between the same thereby resulting in the formation of moist porous aggregates of a size substantially greater than the particle size of the original gelatin powder, the amount of moisture being supplied to the material being such that said porous aggregates have a total moisture content of the order of 15 to 25 percent, and then removing excess moisture from the porous aggregates to provide a final product having a moisture content of the order of from 1.5 to 5.0 percent.

6. As a new article of manufacture, a dry gelatin product characterized by the fact that it readily disperses in hot water, said product comprising a dry divided material the particles of which comprise smaller particles of gelatin cemented together by crystallized lactose in the form of porous aggregates of a size substantially greater than the size of the gelatin particles.

7. A product as in claim 6 in which from 25 to 60 percent of the total product is lactose, the remainder being gelatin, and in which the major part of the lactose is crystalline.

References Cited in the file of this patent

UNITED STATES PATENTS

| | | |
|---|---|---|
| 1,735,356 | Neff | Nov. 12, 1929 |
| 2,019,363 | Schulz | Oct. 29, 1935 |

FOREIGN PATENTS

| | | |
|---|---|---|
| 596,731 | Great Britain | Jan. 9, 1948 |